United States Patent
Takahashi

(10) Patent No.: US 10,302,936 B2
(45) Date of Patent: May 28, 2019

(54) ICLE DISPLAY DEVICE

(71) Applicant: Yazaki Corporation, Tokyo (JP)

(72) Inventor: Yoshihiro Takahashi, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 15/673,071

(22) Filed: Aug. 9, 2017

(65) Prior Publication Data

US 2018/0095266 A1  Apr. 5, 2018

(30) Foreign Application Priority Data

Oct. 4, 2016 (JP) ................. 2016-196632

(51) Int. Cl.
*G02B 26/08* (2006.01)
*G02B 13/16* (2006.01)
*G02B 26/10* (2006.01)
*G02B 27/01* (2006.01)
*H04N 9/31* (2006.01)

(52) U.S. Cl.
CPC ......... *G02B 26/0833* (2013.01); *G02B 13/16* (2013.01); *G02B 26/101* (2013.01); *G02B 26/105* (2013.01); *G02B 27/0101* (2013.01); *H04N 9/3129* (2013.01)

(58) Field of Classification Search
CPC ........ G02B 27/0172; G02B 2027/0178; G02B 27/0101; G02B 27/0176; G02B 2027/0125; G02B 2027/015
USPC ....................................... 359/633
See application file for complete search history.

(56) References Cited

U.S. PATENT DOCUMENTS

| 8,755,655 B2 * | 6/2014 | Krishnamoorthy | G02B 6/12 385/14 |
| 2016/0161742 A1 * | 6/2016 | Yonemoto | B60K 35/00 349/11 |
| 2017/0235138 A1 * | 8/2017 | Morohashi | B60K 35/00 359/631 |

FOREIGN PATENT DOCUMENTS

JP  2016-33651 A  3/2016

* cited by examiner

*Primary Examiner* — Mohammed A Hasan
(74) *Attorney, Agent, or Firm* — Kenealy Vaidya LLP

(57) ABSTRACT

A vehicle display device includes an image generator including a light source that emits laser light and a mirror that projects an image onto a screen by reflecting laser light incoming from the light source toward the screen while oscillating with turning movements about two rotation axes perpendicular to each other and a magnifier provided between a reflection section located in front of an eye point set in a vehicle and the screen, and configured to project an image onto the screen while magnifying the image. The image generator includes a first image generator configured to generate an image to be projected onto a first region and a second image generator configured to generate an image to be projected onto a second region. The first region overlaps with a view ahead of the vehicle as viewed from the eye point. The second region is located around the first region.

8 Claims, 10 Drawing Sheets

LONGITUDINAL DIRECTION
FRONTWARD ←→ REARWARD

FRONTWARD ←——→ REARWARD

VEHICLE DISPLAY DEVICE

CROSS-REFERENCE TO RELATED APPLICATION(S)

The present application claims priority to and incorporates by reference the entire contents of Japanese Patent Application No. 2016-196632 filed in Japan on Oct. 4, 2016.

BACKGROUND OF THE INVENTION

1. Field of the Invention

The present invention relates to a vehicle display device.

2. Description of the Related Art

A conventional technique of projecting images with a mirror that oscillates with turning movements is used for a vehicle display device. For example, Japanese Patent Application Laid-open No. 2016-033651 discloses techniques of a light deflector and an image projection device including the light deflector. Here, the light deflector includes a mirror unit having a light reflection plane, a pair of elastic supporting members each having one end thereof secured to the mirror unit and each supporting the mirror member so as to allow the mirror member to oscillate with turning movements, a pair of drive bars each having a structure that is deformed upon application of voltage and each having one end secured to the other end of the corresponding elastic supporting member, and a base member having the other ends of the drive bars secured thereto in a cantilevered fashion. In the light deflector, deformation of the drive bars due to the application of voltage is transmitted to the mirror unit via the elastic supporting member and causes the mirror unit to oscillate with turning movements.

Appropriate display positions for images displayed by the vehicle display device may be different depending on the kinds of image. For example, some images are desired to be displayed in a state superimposed on a view ahead of a vehicle, while other images are in low need of being displayed in a state superimposed on the view ahead. There is still room for improvement in terms of displaying respective images at the appropriate positions thereof. For example, in order to project the respective images at appropriate positions via one mirror oscillating with turning movements, the mirror may possibly need to scan too large a range.

SUMMARY OF THE INVENTION

An object of the present invention is to provide a vehicle display device capable of displaying respective images at the appropriate positions thereof without enlargement of the range of scanning by the mirror.

In order to achieve the above mentioned object, a vehicle display device according to one aspect of the present invention includes an image generator including a light source that emits laser light and a mirror that projects an image onto a screen by reflecting laser light incoming from the light source toward the screen while oscillating with turning movements about two rotation axes perpendicular to each other, and a magnifier provided between a reflection section located in front of an eye point set in a vehicle and the screen, the magnifier being configured to project an image onto the screen while magnifying the image, wherein the image generator includes a first image generator configured to generate an image to be projected onto a first region in the reflection section, and a second image generator configured to generate an image to be projected onto a second region in the reflection section, the first region is a region, in the reflection section, that overlaps with a view ahead of the vehicle as viewed from the eye point, and the second region is a region located in a surrounding area of the first region.

According to another aspect of the present invention, in the vehicle display device, the image generator may include a first mirror that is provided in the first image generator and serving as the mirror, a second mirror that is provided in the second image generator and serving as the mirror, and a switching unit configured to selectively direct laser light emitted from the light source to one of the first mirror and the second mirror.

According to still another aspect of the present invention, in the vehicle display device, the second region may be a region located below the first region.

According to still another aspect of the present invention, in the vehicle display device, a virtual image formed from the image projected onto the first region may be located ahead of the vehicle at a longer distance viewed from the eye point than a virtual image formed from the image projected onto the second region.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes vehicle display devices according to embodiments of the present invention in detail with reference to the drawings. These embodiments are not intended to limit this invention. The following embodiments include components that can be conceived easily by the skilled person or that are substantially identical with each other.

First Embodiment

Figure 1:
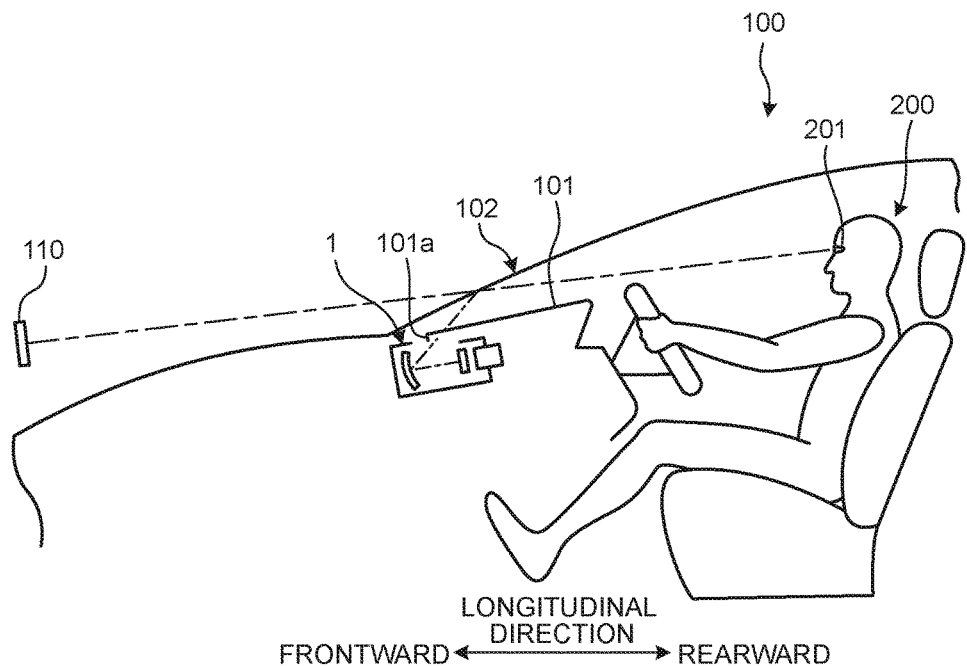
FIG. 1 is a schematic diagram illustrating an arrangement of a vehicle display device according to a first embodiment.
Figure 2:
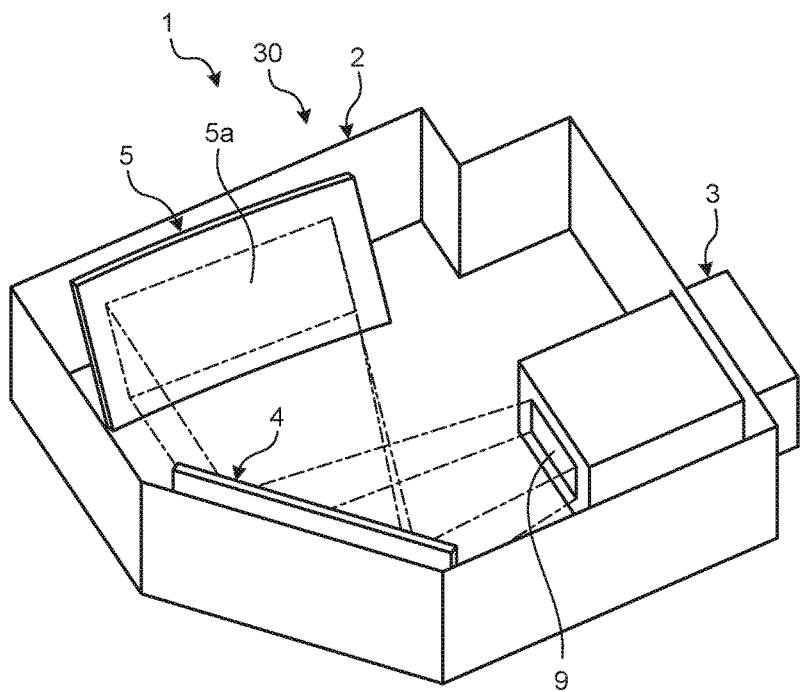
FIG. 2 is a perspective view illustrating an internal configuration of the vehicle display device according to the first embodiment.
Figure 3:
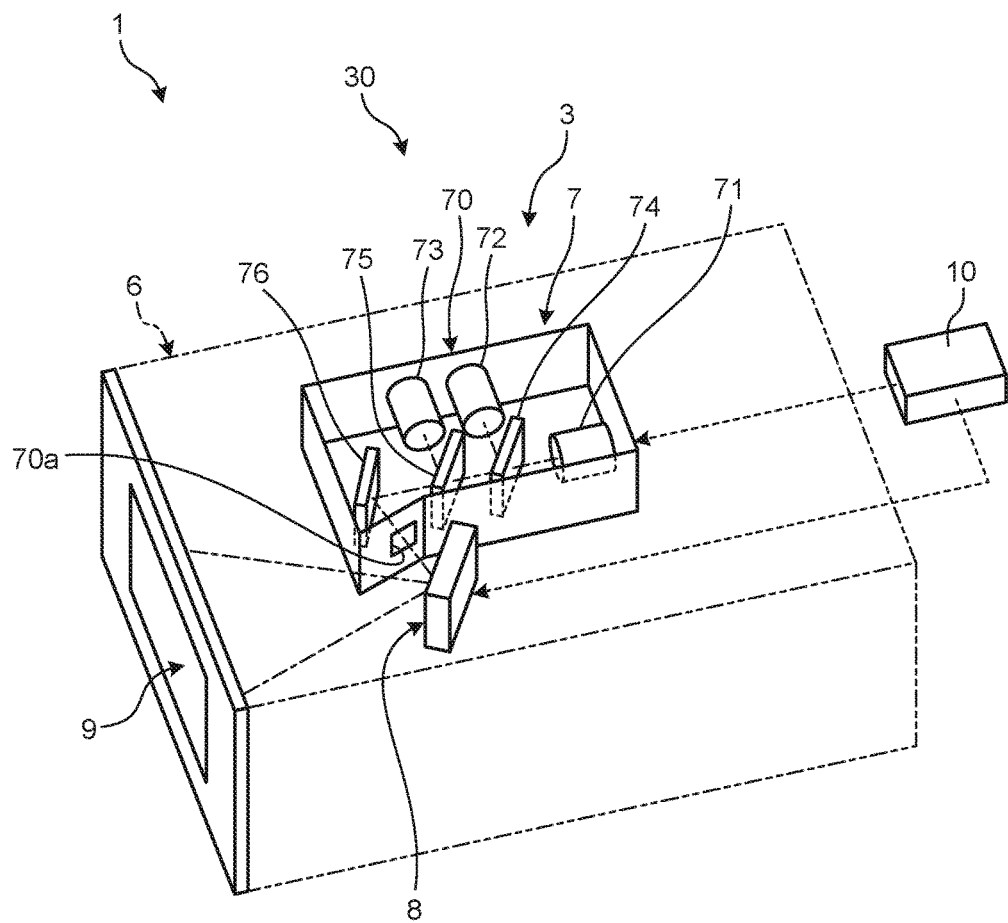
FIG. 3 is a perspective view illustrating an internal configuration of a laser display according to the first embodiment.
Figure 4:
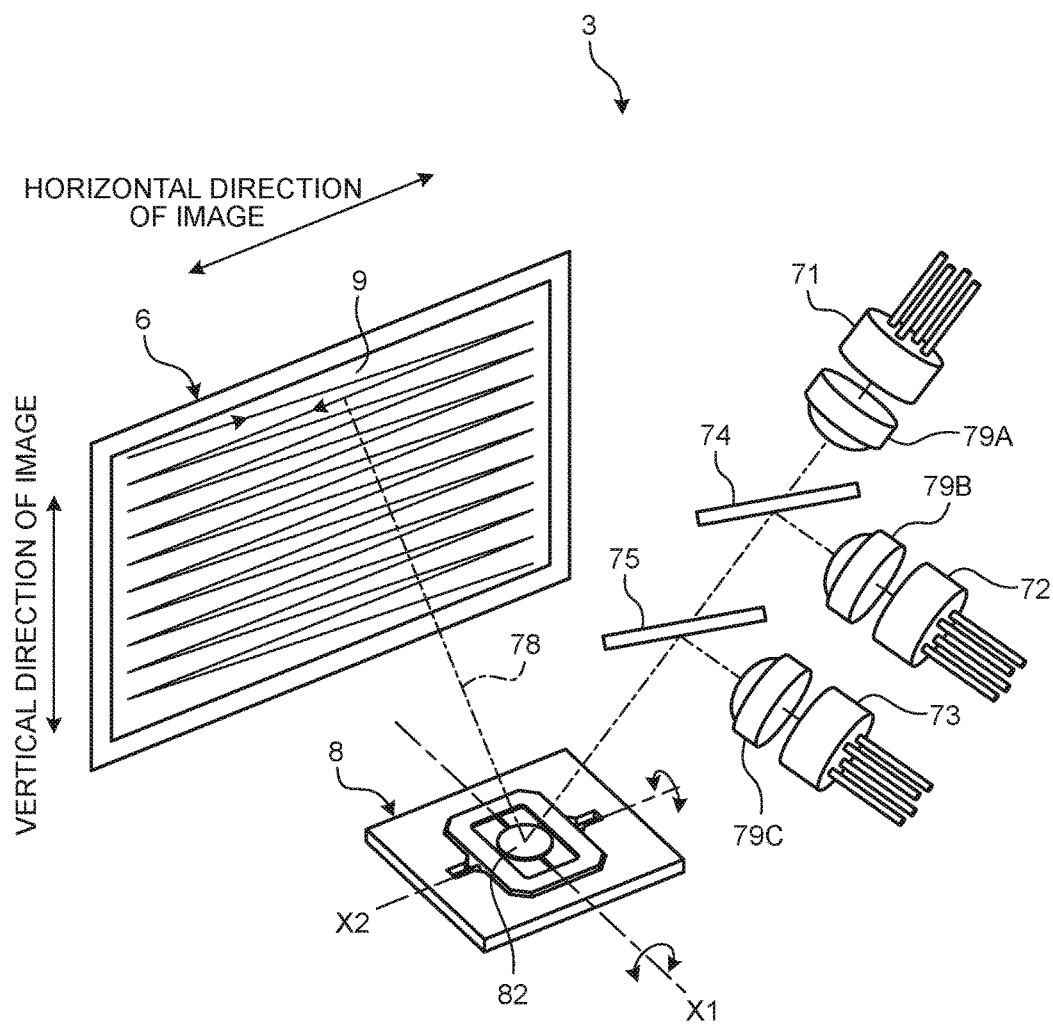
FIG. 4 is an explanatory view explaining generation of images by the laser display according to the first embodiment.
Figure 5:
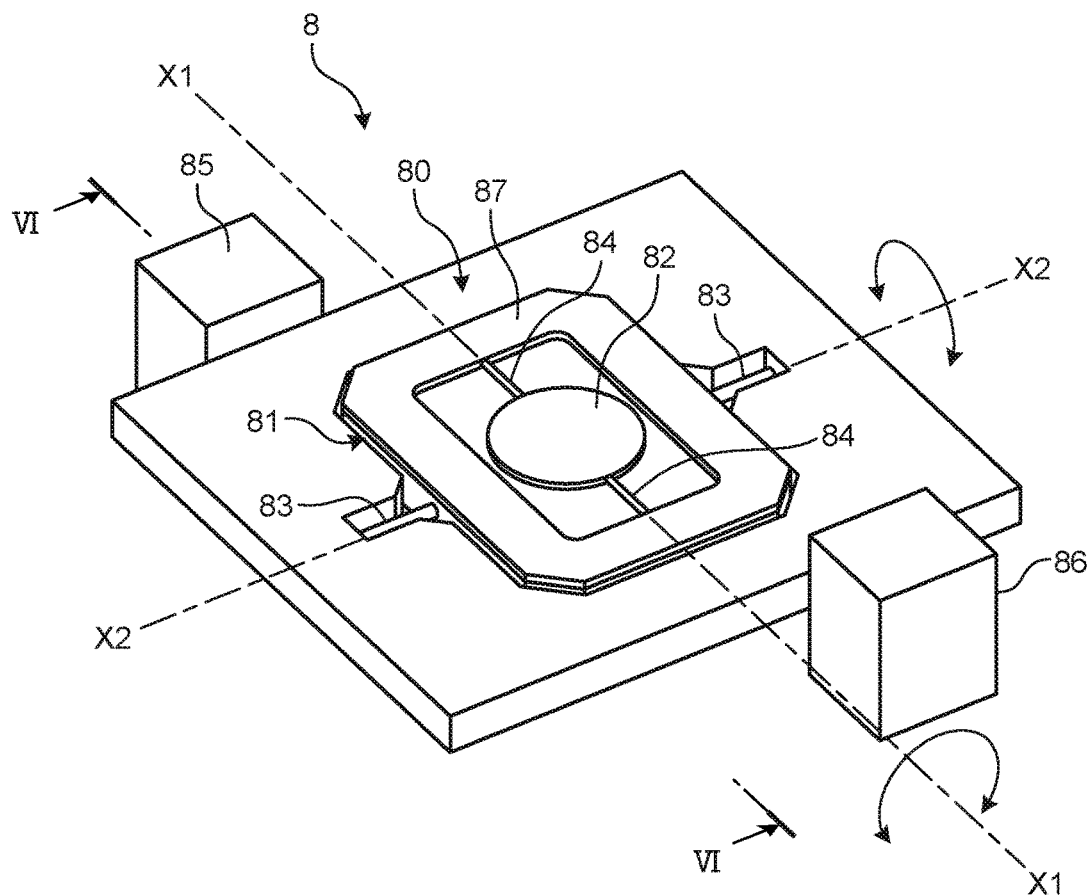
FIG. 5 is a perspective view of a micro electro mechanical systems (MEMS) mirror according to the first embodiment.
Figure 6:
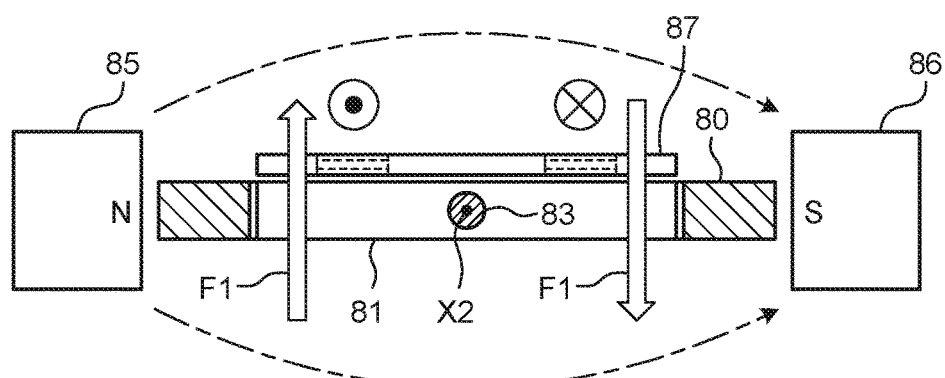
FIG. 6 is a sectional view of the MEMS mirror according to the first embodiment.
Figure 7:
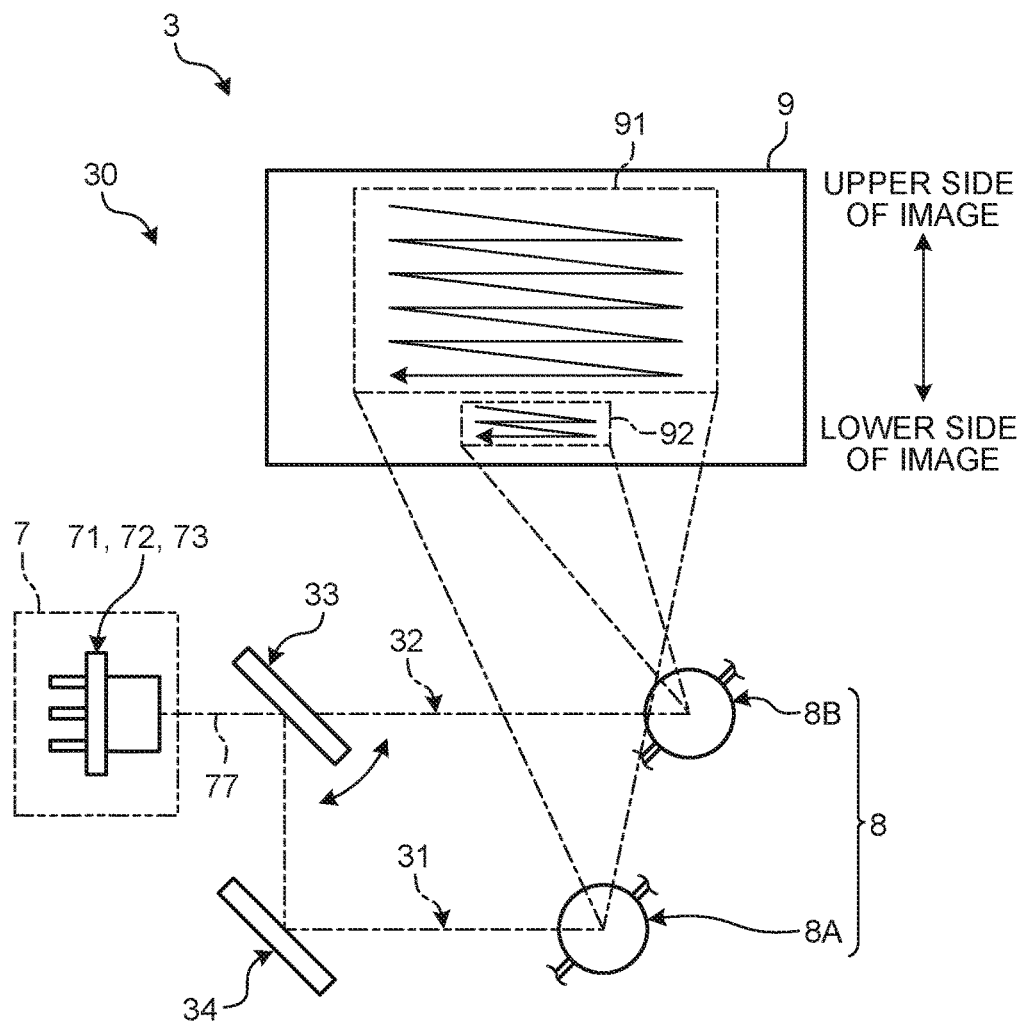
FIG. 7 is a diagram of an image generator according to the first embodiment.
Figure 8:
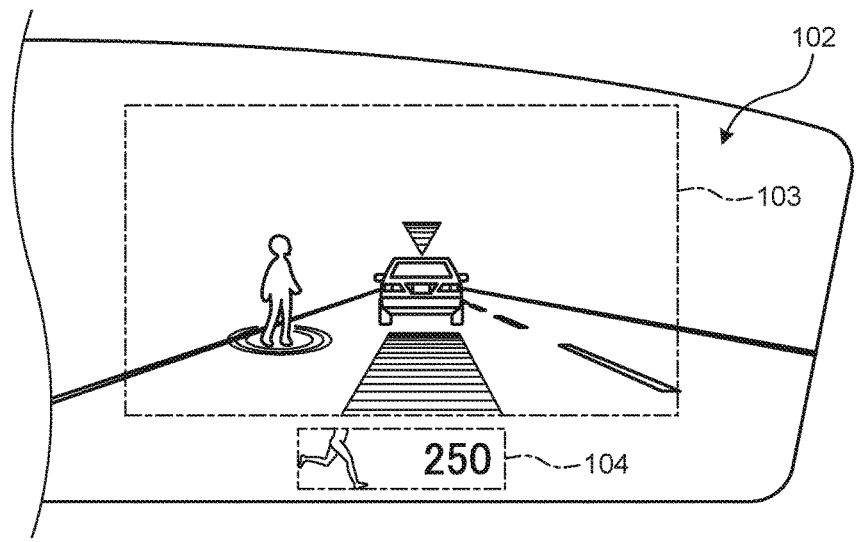
FIG. 8 is a diagram illustrating a first region and a second region in the first embodiment.
Figure 9:
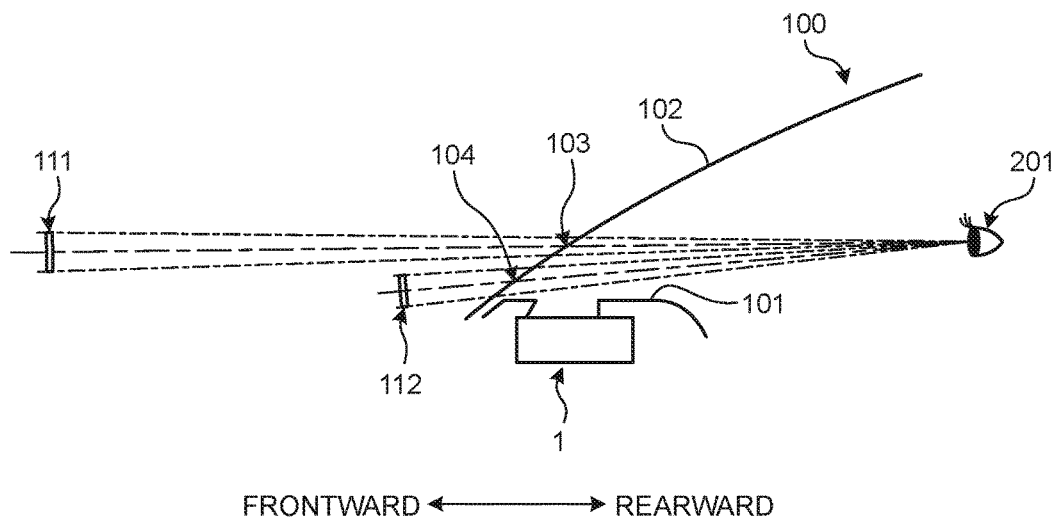
FIG. 9 is a diagram illustrating an imaging position of a virtual image in the first embodiment.

A first embodiment is described with reference to FIG. 1 to FIG. 9. The present embodiment relates to a vehicle display device. FIG. 1 is a schematic diagram illustrating an arrangement of a vehicle display device according to the first embodiment, FIG. 2 is a perspective view illustrating an internal configuration of the vehicle display device according to the first embodiment, FIG. 3 is a perspective view illustrating an internal configuration of a laser display according to the first embodiment, FIG. 4 is an explanatory view explaining generation of images by the laser display according to the first embodiment, FIG. 5 is a perspective view of a micro electro mechanical systems (MEMS) mirror according to the first embodiment, FIG. 6 is a sectional view of the MEMS mirror according to the first embodiment, FIG. 7 is a diagram of an image generator according to the first embodiment, FIG. 8 is a diagram illustrating a first region and a second region in the first embodiment, and FIG. 9 is a diagram illustrating the imaging position of a virtual image in the first embodiment. Here, FIG. 6 illustrates a section taken along the VI-VI line in FIG. 5.

As illustrated in FIG. 1, a vehicle display device 1 according to the first embodiment is what is called a head-up display device, and displays virtual images in front of an eye point 201 set in a vehicle 100. The eye point 201 is a position previously determined as an observing point of a driver 200 sitting on a driver's seat. The vehicle display device 1 is disposed inside a dashboard 101 of the vehicle 100. The dashboard 101 has an opening 101a in the upper surface thereof. The vehicle display device 1 projects an image or images onto a windshield 102 through this opening 101a. The windshield 102 is a reflection section located in front of the eye point 201 in the vehicle 100. For example, the windshield 102 has semi-transparency and reflects light incident from the vehicle display device 1 toward the eye point 201. The driver 200 recognizes images reflected by the windshield 102 as virtual images 110. The driver 200 recognizes the virtual images 110 as if they exist ahead of the windshield 102.

As used herein, unless otherwise stated, the term "longitudinal direction" means a direction of the front and rear (frontward and rearward direction) of the vehicle 100 having the vehicle display device 1 installed therein. Additionally, unless otherwise stated, the term "lateral direction" means a direction of the width of the vehicle 100, and the term "top-to-bottom direction" means a direction of the top and bottom (upward and downward direction) of the vehicle 100.

As illustrated in FIG. 2, the vehicle display device 1 includes a housing 2, a laser display 3, a plane mirror 4, and a curved mirror 5. The laser display 3, the plane mirror 4, and the curved mirror 5 are housed in the housing 2. The laser display 3 projects images onto a screen 9 with laser light in the manner described later. An image projected onto the screen 9 is reflected on the plane mirror 4 and then on the curved mirror 5. After being reflected by the curved mirror 5, the image passes through an opening formed in the housing 2 and then through the opening 101a in the dashboard 101 to be projected onto the windshield 102. A reflecting surface 5a of the curved mirror 5 is a concave curved surface and reflects light incoming from the plane mirror 4 toward the windshield 102 while magnifying the incoming light. That is, the curved mirror 5 is a magnifier provided between the windshield 102 and the screen 9 and operable configured to magnify images projected onto the screen 9 and project them onto the windshield 102. The curved mirror 5 in this embodiment is an aspherical mirror.

As illustrated in FIG. 3, the laser display 3 includes a housing 6, a laser unit 7, at least one MEMS mirror 8, and the screen 9. The laser display 3 includes an image generator 30 including the laser unit 7 serving as a light source and the at least one MEMS mirror 8, and generates an image or images by using this image generator 30. The housing 6 in this embodiment is shaped as a rectangular parallelepiped shape. The laser unit 7 and the MEMS mirror 8 are housed in the interior of the housing 6. The laser unit 7 is a light source that emits laser light, and generates and outputs laser light. The laser unit 7 in this embodiment generates red laser light, green laser light, and blue laser light, superimposes the laser light of the three colors, and outputs the superimposed laser light. The screen 9 is disposed in a side face of the housing 6.

The laser unit 7 includes a housing 70, a red laser diode 71, a green laser diode 72, a blue laser diode 73, dichroic mirrors 74 and 75, and a mirror 76. The housing 70 in this embodiment is shaped as a rectangular parallelepiped shape. The laser diodes 71, 72, and 73, the dichroic mirror 74 and 75, and the mirror 76 are housed in the interior of the housing 70.

The red laser diode 71 generates red laser light. Laser light output from the red laser diode 71 passes through a collimator lens 79A (see FIG. 4) and then reaches the dichroic mirror 74. The green laser diode 72 generates green laser light. Laser light output from the green laser diode 72 passes through a collimator lens 79B and then reaches the dichroic mirror 74. The blue laser diode 73 generates blue laser light. Laser light output from the blue laser diode 73 passes through a collimator lens 79C and then reaches the dichroic mirror 75.

The dichroic mirror 74 transmits red laser light and reflects green laser light. Red laser light and green laser light reflected on the dichroic mirror 74 are combined into laser light on the same optical axis and reaches the dichroic mirror 75. The dichroic mirror 75 transmits red laser light and green laser light and reflects blue laser light. Red laser light, green laser light, and blue laser light reflected by the dichroic mirror 75 are combined into laser light on the same optical axis and reaches the mirror 76. The mirror 76 is a mirror that totally reflects laser light. Laser light of these colors reflected on the mirror 76 passes through an exit hole 70a of the housing 70 and reaches the MEMS mirror 8.

The vehicle display device 1 includes a controller 10 that controls the laser unit 7 and the MEMS mirror 8. The controller 10 controls a quantity of light and colors of laser light to be generated and emitted by the laser unit 7. The controller 10 controls the output from the respective laser diodes 71, 72, and 73 based on target values for the quantity of light and colors of laser light to be emitted. In the vehicle display device 1, the amplitude and the frequency of oscillation with turning movements, to be described later, of the MEMS mirror 8.

As illustrated FIG. 4, the MEMS mirror 8 reflects laser light toward the screen 9 while oscillating with turning movements about two rotation axes X1 and X2 perpendicular to each other, thus projecting images onto the screen 9. The MEMS (micro electro mechanical system) technique is used for the fabrication of the MEMS mirror 8. The MEMS mirror 8 is a device obtained by integrating components such as mechanical elements, a sensor, an actuator, and electronic circuits on a semiconductor substrate. The specific configuration of the MEMS mirror 8 is described later.

Reflected light 78 reflected on the MEMS mirror 8 scans the screen 9 in the horizontal direction of an image with the mirror 82 of the MEMS mirror 8 oscillating with turning movements about a first rotation axis X1. The reflected light 78 scans the screen 9 also in the vertical direction of the image thereon with the mirror 82 of the MEMS mirror 8 oscillating with turning movements about a second rotation axis X2. The laser display 3 projects an image onto the screen 9 with the reflected light 78 while scanning the screen 9 in the horizontal and vertical directions of the image.

The screen 9 is a micro-lens array and composed of multiple integrated micro-lenses. That is, the screen 9 is a transmissive screen that transmits light. Each of the micro-lenses diffuses laser light. Consequently, the laser light reflected on the windshield 102 can be viewed even if the eye point 201 moves within a certain range in accordance with changes in posture of the driver 200.

As illustrated in FIG. 5, the MEMS mirror 8 includes a main body 80, a stage 81, a mirror 82, bars 83 and 84, magnets 85 and 86, and a coil 87. The MEMS mirror 8 is constructed with a monocrystalline silicon wafer used as a base. The main body 80 is a plate-like member having a through-hole. The main body 80 is, for example, a substrate having a control circuit formed thereon. The stage 81 is a plate-like member having a through-hole and is disposed in the through-hole of the main body 80. The stage 81 is connected to the main body 80 by the two bars 83 extending in the direction parallel to the second rotation axis X2. The respective bars 83 connect two opposite sides of the stage 81 with the main body 80. The spirally wound coil 87 is disposed on a front surface of the stage 81. Power is supplied to the coil 87 from the main body 80 side.

The mirror 82 is a disc-like member. The mirror 82 is disposed in the through-hole of the stage 81. The mirror 82 is connected to the stage 81 by the two bars 84 extending in the direction parallel to the first rotation axis X1. The first rotation axis X1 and the second rotation axis X2 are perpendicular to each other. The magnets 85 and 86 are respectively disposed in two opposite sides of the main body 80 and disposed to oppose to each other across the first rotation axis X1. As illustrated in FIG. 6, the magnet 85 of these magnets has its north pole facing the coil 87, and the other magnet 86 has its south pole facing the coil 87. As illustrated in FIG. 6, when current flows through the coil 87, magnetic fields of the magnets 85 and 86 cause Lorentz force F1 to act on the coil 87. This Lorentz force F1 causes the stage 81 to rotate about the second rotation axis X2 relative to the main body 80. The controller 10 controls current to flow through the coil 87. The controller 10 controls the direction and the current value of current to flow through the coil 87, thereby causing the stage 81 to oscillate with turning movements at a first frequency previously determined. More specifically, in accordance with the first frequency, the controller 10 periodically reverses the direction of current to flow through the coil 87. Consequently, the stage 81 periodically oscillates with turning movements while alternately turning toward the forward phase side and the backward phase side. The first frequency is determined based on the number of frames per unit time for images to be projected onto the screen 9.

The mirror 82 oscillates with turning movements about the first rotation axis X1 by resonance. That is, the mirror 82 rotates relative to the stage 81 by the resonance. The specifications of the mirror 82 and the bars 84 are designed so that the mirror 82 can oscillate with turning movements at a second frequency when the stage 81 oscillates with turning movements at the first frequency. The second frequency is determined based on the number of scans per frame in the horizontal direction of images.

The image generator 30 in this embodiment includes the laser unit 7 and the MEMS mirror 8. The laser unit 7 is a light source that emits laser light. The mirror 82 of the MEMS mirror 8 reflects the reflected light 78 toward the screen 9 while oscillating with turning movements about the rotation axes X1 and X2, thus projecting images onto the screen 9.

The image generator 30 in this embodiment includes a first image generator 31 and a second image generator 32 as illustrated in FIG. 7. The first image generator 31 generates an image or images to be projected onto a first region 103 in the windshield 102 illustrated in FIG. 8. The second image generator 32 generates an image or images to be projected onto a second region 104 in the windshield 102 illustrated in FIG. 8. As illustrated in FIG. 8, the two regions 103 and 104 are different regions in this embodiment. The first region 103 is a region in the windshield 102 that overlaps a view ahead of the vehicle 100 as viewed from the eye point 201. The second region 104 is a region located in a surrounding area of the first region 103. The second region 104 in this embodiment is a region located below the first region 103 in the windshield 102. An area of the second region 104 is smaller than an area of the first region 103. A vertical width of the second region 104 is smaller than a vertical width of the first region 103. The vertical width of the first region 103 may be one half of a vertical width of the windshield 102 or more, and may be three fourths of the vertical height of the windshield 102 or more.

With reference to FIG. 7 again, the first image generator 31 includes the laser unit 7, a first MEMS mirror 8A and a reflecting mirror 34. The second image generator 32 includes the laser unit 7 and a second MEMS mirror 8B. That is, the laser unit 7 is shared by the two image generators 31 and 32. The MEMS mirror 8 includes the first MEMS mirror 8A and the second MEMS mirror 8B. The first MEMS mirror 8A is disposed in the first image generator 31, serving as the MEMS mirror 8. The second MEMS mirror 8B is disposed in the second image generator 32, serving as the MEMS mirror 8.

The image generator 30 includes a switching mirror 33. The switching mirror 33 corresponds to a switching unit that selectively causes laser light emitted by the laser unit 7 (hereinafter referred simply as "emitted light 77") to reach either of the first MEMS mirror 8A and the second MEMS mirror 8B. The switching mirror 33 in this embodiment is an MEMS mirror. The switching mirror 33 includes an actuator that changes the rotational position thereof. The rotational position of the switching mirror 33 is switched by the actuator between a first rotational position and a second rotational position.

The first rotational position is a rotational position that allows the emitted light 77 to reach the first MEMS mirror 8A, as illustrated in FIG. 7. During the first rotational position, the switching mirror 33 is positioned on an optical path of the emitted light 77, and reflects the emitted light 77 toward the reflecting mirror 34. The reflecting mirror 34 reflects laser light coming thereto from the switching mirror 33 toward the first MEMS mirror 8A. The first MEMS mirror 8A reflects laser light toward a first screen region 91 in the screen 9. The first screen region 91 corresponds to the first region 103 in the windshield 102. That is, an image on the first screen region 91 is projected by the plane mirror 4 and the curved mirror 5 onto the first region 103 in the windshield 102.

During the second rotational position, the switching mirror 33 is set outside of the optical path of the emitted light 77, and allows the emitted light 77 to go straight toward the second MEMS mirror 8B. The emitted light 77 that has come to the second MEMS mirror 8B is reflected by the second MEMS mirror 8B toward the screen 9. The second MEMS mirror 8B reflects the emitted light 77 toward a second screen region 92 in the screen 9. The second screen region 92 corresponds to the second region 104 in the windshield 102. That is, an image on the second screen region 92 is projected by the plane mirror 4 and the curved mirror 5 onto the second region 104 in the windshield 102.

The switching mirror 33 is controlled by the controller 10. The controller 10 switches the switching mirror 33 between the rotational positions, for example, when frames are switched. In one example, upon completion of image projection corresponding to one frame on the first screen region 91, the controller 10 switches the switching mirror 33 from the first rotational position to the second rotational position. Upon completion of image projection corresponding to one frame on the second screen region 92, the controller 10 switches the switching mirror 33 from the second rotational position to the first rotational position. Consequently, images are projected alternately onto the first region 103 and onto the second region 104 in the windshield 102. The controller 10 may control the switching mirror 33 so that the number of frames to be projected onto the first region 103 per unit time increases more than the number of frames to be projected onto the second region 104 per unit time.

As described above, the vehicle display device 1 according to this embodiment includes the curved mirror 5 serving as an magnifier that projects the images on the screen 9 onto the windshield 102 while magnifying the images. The curved mirror 5 projects images onto the first region 103 and the second region 104 in the windshield 102. An image projected onto the first region 103 is recognized by the driver 200 as a virtual image superimposed on a view ahead of the vehicle 100 as viewed from the eye point 201. Images to be projected onto the first region 103 are, for example, those for drawing the attention to the driver 200. The vehicle display device 1 according to this embodiment that includes the curved mirror 5 serving as the magnifier makes it possible to set up the first region 103 spanning a wide range on the windshield 102. Thus, virtual images can be displayed on a wide region in front of the eye point 201 in a state superimposed on the view ahead. Therefore, the vehicle display device 1 according to this embodiment can provide passengers of the vehicle 100 with various forms of information.

The second region 104 is a region located in a surrounding area of the first region 103. In this embodiment, information in low need to be superimposed on the view ahead is displayed on the second region 104. Information to be displayed on the second region 104 is, for example, information that relates to the conditions of the vehicle 100 but is not highly relevant to the view ahead. The information to be displayed on the second region 104 includes information on the running conditions, such as the running speed, the engine revolutions per minute, and the gasoline mileage, of the vehicle 100.

In the second region 104, information relating to the surrounding environment of the vehicle 100 and in low need to be superimposed on the view ahead may be displayed. The information relating to the surrounding environment includes: information on any moving object, such as another vehicle or a pedestrian, present around the vehicle 100; and information on surrounding roads. Even if there is a moving object around, if the likelihood that the moving object affects the driving of the driver 200 is low, alerting the driver 200 to the moving object is not highly needed. The presence of such moving object may be displayed in the second region 104. Other information such as navigation information may be displayed in the second region 104. The second region 104 is, for example, a region that overlaps a body of the vehicle 100 as viewed from the eye point 201, a region to which a depression angle from the eye point 201 is a predetermined angle or more, or a region included in a peripheral visual field with respect to a view as viewed horizontally frontward from the eye point 201.

In the vehicle display device 1 in this embodiment, an image-projected area is divided into the first region 103 and the second region 104. Thus, each of the regions is prevented from having too large a size. In a case where an image in the first region 103 and an image in the second region 104 are displayed using only one MEMS mirror 8, the MEMS mirror 8 is used to display images in a larger region on the screen 9, and the oscillation angle of the MEMS mirror 8 therefore needs to be larger. In contrast, the vehicle display device 1 in this embodiment has the image generator 30 including separated two sections corresponding to the respective regions 103 and 104. The necessary oscillation angles of the first MEMS mirror 8A and the second MEMS mirror 8B are smaller than the case described above. Therefore, the MEMS mirrors 8A and 8B are prevented from being deformed when oscillating with turning movements. The resulting effects include that images projected onto the respective regions 103 and 104 do not suffer from resolution reduction that they would otherwise suffer from.

Figure 14:
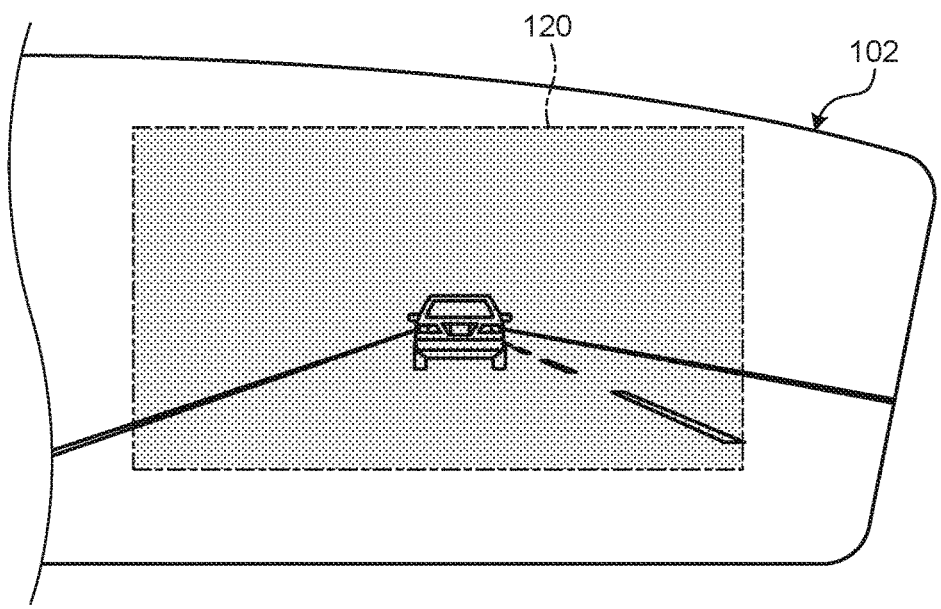
FIG. 14 is a diagram illustrating a windshield having an image projected thereon by a liquid crystal display device.

In the vehicle display device 1 in this embodiment, what is called "black brightening" due to unwanted light added to an image on the windshield 102 is prevented. For example, a liquid crystal display device, such as a thin film transistor liquid crystal display (TFT-LCD), is used as a device that projects images in some cases. FIG. 14 is a diagram illustrating a windshield having an image projected thereon by a liquid crystal display device. With the liquid crystal display device, light from the backlight leaks to a background region other than elements displayed as a virtual image, such as characters and figures, and is added to an image on the windshield 102. This may cause black brightening of an image display region 120, that is, make the image display region 120 smoky as illustrated FIG. 14. In contrast, with the vehicle display device 1 in this embodiment, the laser unit 7 is stopped from emitting laser light for a background region. Therefore, black lightening that is bothersome to the driver 200 is less likely to occur.

In the vehicle display device 1 in this embodiment, the first MEMS mirror 8A in the first image generator 31 and the second MEMS mirror 8B in the second image generator 32 are separately provided. The switching mirror 33 selectively causes laser light emitted from the laser unit 7 to reach one of the first MEMS mirror 8A and the second MEMS mirror 8B. This can reduce the amounts of heat generated by the MEMS mirrors 8A and 8B.

As illustrated in FIG. 9, the vehicle display device 1 in this embodiment is configured so that, as viewed from the eye point 201, a virtual image 111 formed from an image projected onto the first region 103 can be located at a longer distance ahead of the vehicle 100 than a virtual image 112 formed from an image projected onto the second region 104. That is, the virtual image 111 superimposed on the view ahead appears to the driver 200 to be located at a longer distance ahead than the virtual image 112 corresponding to the second region 104. For such a configuration, the vehicle display device 1 in this embodiment uses a setup in which the optical path of the first image generator 31 is longer than the optical path of the second image generator 32. Virtual images superimposed on the view ahead are formed at a position ahead of the vehicle 100 in the longitudinal direction thereof, and such formation makes it easier for the driver 200 to view the virtual images.

First Modification of First Embodiment

Figure 10:
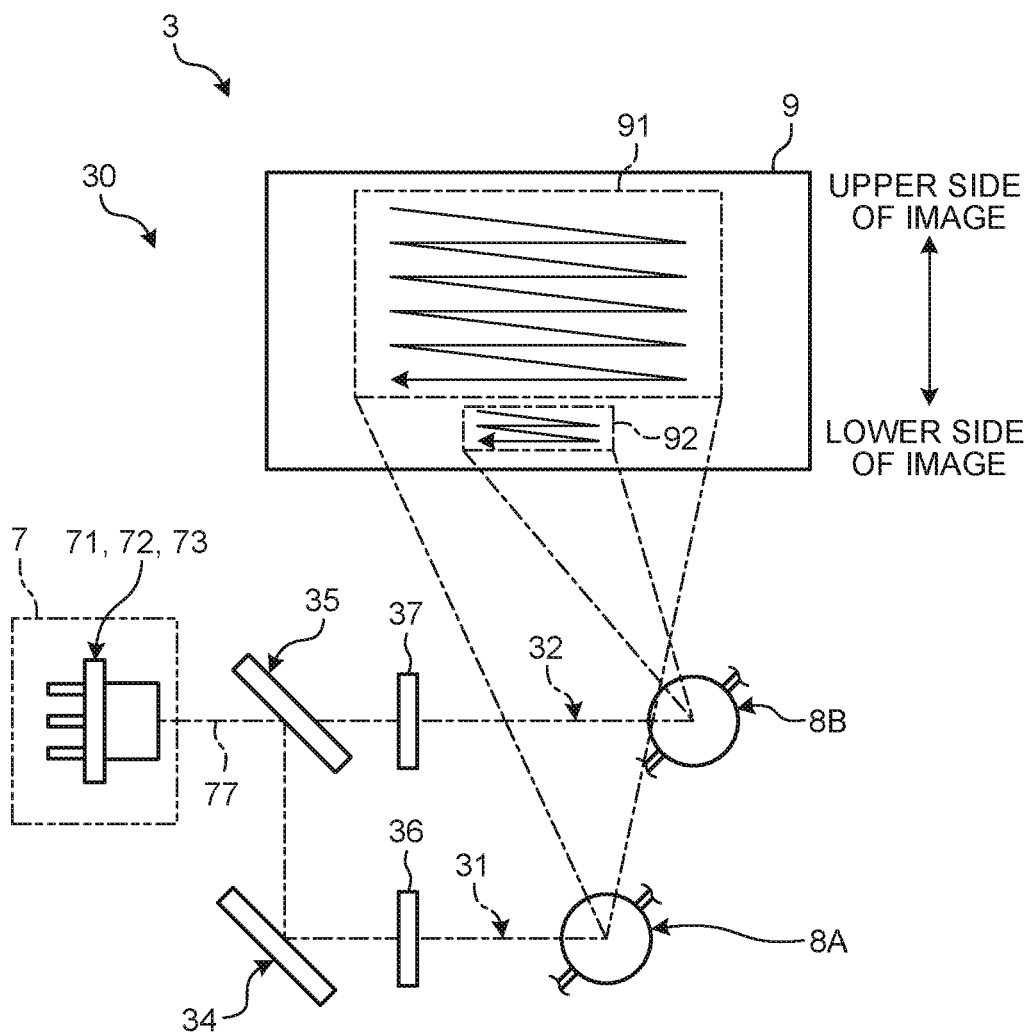
FIG. 10 is a diagram of an image generator according to a first modification of the first embodiment.

A first modification of the first embodiment is described. FIG. 10 is a diagram of an image generator according to the first modification of the first embodiment. Differently from the image generator 30 according to the foregoing first embodiment, the image generator 30 according to the first modification includes a half mirror 35 and shutters 36 and 37. The half mirror 35 is disposed on the optical path of the emitted light 77 emitted from the laser unit 7. The half mirror 35 is a semi-transparent mirror that transmits part of the emitted light 77 and reflects the rest.

The reflecting mirror 34 is disposed on an optical path of laser light reflected on the half mirror 35. The reflecting mirror 34 reflects incident light from the half mirror 35 toward the first MEMS mirror 8A. The first shutter 36 is disposed on an optical path between the reflecting mirror 34 and the first MEMS mirror 8A. The first shutter 36 shuts and opens the optical path between the reflecting mirror 34 and the first MEMS mirror 8A.

The second MEMS mirror 8B is disposed on an optical path of laser light that passes through the half mirror 35. The second shutter 37 is disposed on an optical path between the half mirror 35 and the second MEMS mirror 8B. The second shutter 37 shuts and opens the optical path between the half mirror 35 and the second MEMS mirror 8B.

Switching between the first shutter 36 and the second shutter 37 is controlled by the controller 10 so that one of them can be opened while the other is shut. For example, when images are projected onto the first screen region 91, the first shutter 36 is opened and the second shutter 37 is shut. Consequently, the optical path of the first image generator 31 is opened, and the optical path of the second image generator 32 is shut. In this case, the controller 10 controls output of the respective laser diodes 71, 72, and 73 in accordance with images to be projected onto the first screen region 91.

When images are projected onto the second screen region 92, the second shutter 37 is opened and the first shutter 36 is shut. In this case, the controller 10 controls outputs of the respective laser diodes 71, 72, and 73 in accordance with images to be projected onto the second screen region 92.

A dichroic mirror may be disposed in place of the half mirror 35. In such a case, laser light emitted from the laser unit 7 that has a limited wavelength range is projected onto the second screen region 92. For example, the wavelength ranges of laser light that can be projected onto the second screen region 92 may be limited to a single range. In one example in which a mirror having the characteristics of reflecting blue laser light and transmitting red laser light and green laser light is used as the dichroic mirror, images formed with laser light in wavelength ranges of red and green can be projected onto the first screen region 91, and images formed with blue laser light can be projected onto the second screen region 92. The use of a dichroic mirror thus makes it possible to project images onto the two screen regions 91 and 92 from the single laser unit 7.

Second Modification of First Embodiment

Figure 11:
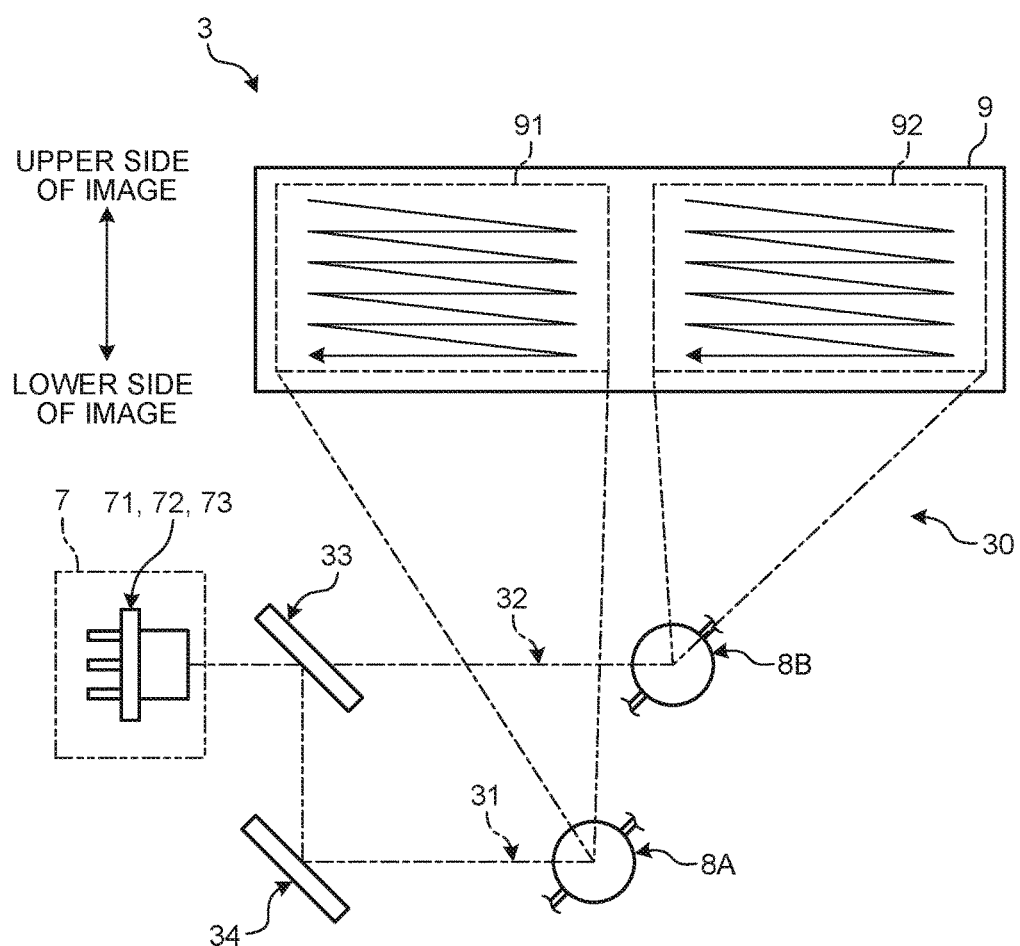
FIG. 11 is a diagram of an image generator according to a second modification of the first embodiment.

A second modification of the first embodiment is described. FIG. 11 is a diagram of an image generator according to the second modification of the first embodiment. Differently from the image generator 30 according to the foregoing first embodiment, the image generator 30 according to the second modification has the first screen region 91 and the second screen region 92 arranged adjacent to each other in the lateral direction of images. Therefore, the first region 103 and the second region 104 are arranged adjacent to each other in the lateral direction in the windshield 102. The first image generator 31 projects images onto the first screen region 91, and the second image generator 32 projects images onto the second screen region 92.

The screen regions 91 and 92 thus arranged adjacent to each other in the lateral direction of images can serve as a wide screen. For example, it is possible to cause the first image generator 31 to project images onto the left half region of a region overlapping the view ahead of the vehicle 100 and cause the second image generator 32 to project images onto the right half region thereof. Wide display presentation and resolution enhancement are can be accomplished without increasing oscillation angles at which the MEMS mirrors 8A and 8B oscillate with turning movements.

Second Embodiment

Figure 12:
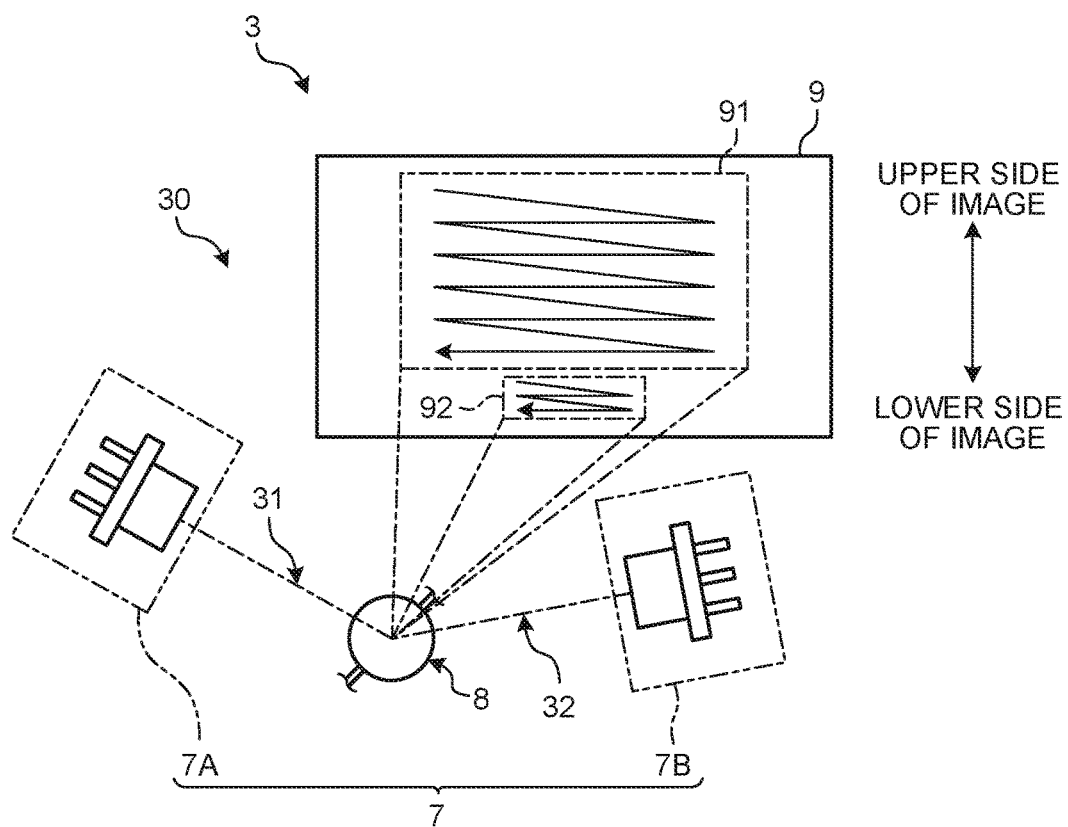
FIG. 12 is a diagram of an image generator according to a second embodiment.

A second embodiment is described with reference to FIG. 12 to FIG. 13. FIG. 12 is a diagram of an image generator according to the second embodiment. In the second embodiment, the same reference signs denote components having the same functions as those described in the first embodiment, and redundant descriptions are omitted. Differently from the image generator 30 according to the foregoing first embodiment, the image generator 30 according to the second embodiment includes one MEMS mirror 8 and two laser units 7, that is, laser units 7A and 7B. As illustrated FIG. 12, the laser units 7 include the first laser unit 7A and the second laser unit 7B. The first laser unit 7A is one of the laser units 7 that is provided in the first image generator 31. The first image generator 31 includes the first laser unit 7A and the MEMS mirror 8. The second laser unit 7B is the other one of the laser unit 7 that is provided in the second image generator 32. The second image generator 32 includes the second laser unit 7B and the MEMS mirror 8.

The first laser unit 7A and the second laser unit 7B emit laser light toward the one MEMS mirror 8 from different directions. Laser light incoming to the MEMS mirror 8 from the first laser unit 7A is reflected toward the first screen region 91 in the screen 9. Laser light incoming to the MEMS mirror 8 from the second laser unit 7B is reflected toward the second screen region 92 in the screen 9.

Figure 13:
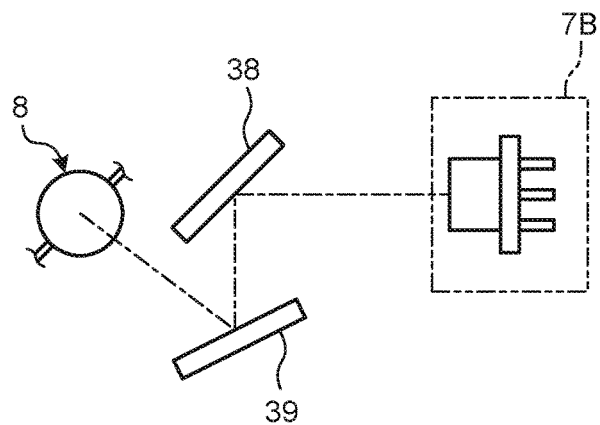
FIG. 13 is a diagram illustrating an example of adjustment of an incoming direction via reflecting mirrors.

FIG. 13 is a diagram representing an example of adjustment of an incoming direction by means of reflecting mirrors. The incoming direction of laser light with respect to the MEMS mirror 8 may be adjusted by means of reflecting mirrors 38 and 39 as illustrated in FIG. 13. The use of the reflecting mirrors 38 and 39 makes the arrangement of the laser units 7A and 7B more flexible.

The image generator 30 may include three or more laser units 7, including not only the first laser unit 7A and the second laser unit 7B but also at least one other laser unit.

Modifications of First and Second Embodiments

Modifications of the first embodiment and the second embodiment are described. The combination of the directions of scanning by each MEMS mirror 8 with laser light and the rotation axes X1 and X2 is not limited to the combination given as an example. For example, as opposed to each of the foregoing embodiments, the combination may be such that, while scanning in the vertical direction of images is implemented with the mirror 82 oscillating with turning movements about the first rotation axis X1, scanning in the horizontal direction of images is implemented with the mirror 82 oscillating with turning movements about the second rotation axis X2. The scanning method is not limited to luster scanning as employed in each of the foregoing embodiments, and may be Lissajous scanning, for example. Examples of the method for driving each MEMS mirror 8 include electromagnetic driving, electrostatic driving, and piezoelectric driving which are representative, but are not limited thereto.

The magnifier that projects images projected onto the screen 9 while magnifying the images is not limited to the curved mirror 5. The magnifier may be, for example, a magnifying lens, such as a convex lens or a Fresnel lens, or another composition.

The reflection section in front of the eye point 201 is not limited to the windshield 102. The reflection section may be a combiner for example.

In each of the foregoing embodiments, the laser diodes included in the laser unit 7 are not limited to the laser diodes 71, 72, and 73 of three colors. The laser unit 7 may include, for example, a laser diode of any one color or laser diodes of two colors among red, green, and blue.

Contents disclosed in the foregoing embodiments and the modifications may be carried out in combination as appropriate.

A vehicle display device according to each of the present embodiments includes an image generator and a magnifier. The image generator includes a light source and a mirror that projects an image onto a screen by reflecting laser light incoming from the light source toward the screen while oscillating with turning movements. The magnifier is provided as an intermediary between a reflection section located ahead of an eye point set in a vehicle and the screen, and projects an image onto the screen while magnifying the image.

The image generator includes a first image generator and a second image generator. The first image generator generates images to be projected onto a first region in the reflection section. The second image generator generates images to be projected onto a second region in the reflection section. The first region is a region, in the reflection section, that overlaps a view ahead of the vehicle as viewed from the eye point, and the second region is a region located in a surrounding area of the first region. The vehicle display device according to the present embodiment produces the effect of displaying respective images at appropriate positions without increasing the range of scanning by a mirror.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
    an image generator including a light source that emits laser light and a mirror that has a first rotation axis and a second rotation axis that is perpendicular to the first axis, and the mirror projects an image onto a screen by reflecting laser light incoming from the light source toward the screen while oscillating with turning movements about the first and second rotation axes; and
    a magnifier provided between a reflection section located in front of an eye point set in a vehicle and the screen, the magnifier being configured to project an image onto the screen while magnifying the image, wherein
    the image generator includes a first image generator configured to generate an image to be projected onto a first region in the reflection section, and a second image generator configured to generate an image to be projected onto a second region in the reflection section,
    the first region is a region, in the reflection section, that overlaps with a view ahead of the vehicle as viewed from the eye point, and
    the second region is a region located in a surrounding area of the first region.

2. The vehicle display device according to claim 1, wherein
    the image generator includes a first mirror that is provided in the first image generator and serving as the mirror, a second mirror that is provided in the second image generator and serving as the mirror, and a switching unit configured to selectively direct laser light emitted from the light source to one of the first mirror and the second mirror.

3. The vehicle display device according to claim 1, wherein
    the second region is a region located below the first region.

4. The vehicle display device according to claim 2, wherein
    the second region is a region located below the first region.

5. The vehicle display device according to claim 1, wherein
    a virtual image formed from the image projected onto the first region is located ahead of the vehicle at a longer distance viewed from the eye point than a virtual image formed from the image projected onto the second region.

6. The vehicle display device according to claim 2, wherein
    a virtual image formed from the image projected onto the first region is located ahead of the vehicle at a longer distance from viewed the eye point than a virtual image formed from the image projected onto the second region.

7. The vehicle display device according to claim 3, wherein
    a virtual image formed from an image projected onto the first region is located ahead of the vehicle at a longer distance viewed from the eye point than a virtual image formed from the image projected onto the second region.

8. The vehicle display device according to claim 1, wherein the image generator includes a half mirror and shutters.

* * * * *